US007547741B2

(12) United States Patent
Pakusch et al.

(10) Patent No.: US 7,547,741 B2
(45) Date of Patent: Jun. 16, 2009

(54) PREPARATION OF POLYMER POWDERS

(75) Inventors: Joachim Pakusch, Speyer (DE);
Markus Koppers, Bad Fallingbostel (DE); Wolfgang Gaschler, Heidelberg (DE); Heinrich Sack, Hassloch (DE); Juergen Schmidt-Thuemmes, Neuhofen (DE); Hans-Juergen Denu, Friedelsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 616 days.

(21) Appl. No.: 10/556,681

(22) PCT Filed: May 10, 2004

(86) PCT No.: PCT/EP2004/004959

§ 371 (c)(1),
(2), (4) Date: Nov. 14, 2005

(87) PCT Pub. No.: WO2004/101657

PCT Pub. Date: Nov. 25, 2004

(65) Prior Publication Data

US 2007/0004834 A1    Jan. 4, 2007

(30) Foreign Application Priority Data

May 19, 2003   (DE)   ................. 103 22 787

(51) Int. Cl.
*C08L 33/24* (2006.01)
*C08F 6/24* (2006.01)
*C04B 14/06* (2006.01)

(52) U.S. Cl. ............... 524/521; 523/342; 524/5; 525/218; 106/401

(58) Field of Classification Search ........... 523/342; 524/5, 521, 539; 525/218; 106/401
See application file for complete search history.

(56) References Cited

U.S. PATENT DOCUMENTS

| 3,597,314 | A | * | 8/1971 | Laube et al. | ............ | 162/168.2 |
| 5,462,978 | A | * | 10/1995 | Penzel et al. | ............ | 523/342 |
| 6,444,729 | B1 | * | 9/2002 | Pakusch et al. | ............ | 524/5 |

FOREIGN PATENT DOCUMENTS

| DE | 23 31 921 | 1/1975 |
| DE | 29 23 206 | 12/1980 |
| DE | 33 45 785 | 6/1985 |
| DE | 40 03 422 | 8/1991 |
| DE | 198 29 520 | 1/2000 |
| DE | 198 59 191 | 6/2000 |
| DE | 100 17 660 | 10/2001 |
| DE | 100 61 877 | 6/2002 |
| DE | 101 18 633 | 10/2002 |
| EP | 601 518 | 6/1994 |
| EP | 861 867 | 9/1998 |
| EP | 924 241 | 6/1999 |
| EP | 1 184 406 | 3/2002 |
| WO | 00/20464 | 4/2000 |
| WO | 00/63277 | 10/2000 |
| WO | 01/44325 | 6/2001 |

OTHER PUBLICATIONS

"Latices", Encyclopedia of Polymer Science and Engineering, vol. 8, pp. 647-677 1987.
D.C. Blackley, "Introduction—1. Definition of a Latex", High Polymer Latices, vol. 1, chapter 1, pp. 3-65 1966.
H. Warson, "Polyester and non-vinyl emulsions", The Applications of Synthetic Resin Emulsions, chapter 5, pp. 246-278 1972.
Dieter Dieterich, "Polyurethane—nach 50 Jahren immer noch jung", Chemie In Unserer Zeit, No. 3, pp. 135-142 1990.
Margarete K. Leclerc, et al., "Alternating ethene/propene copolymerization with a metallocene catalyst", Angew. Chem. Int. Ed., vol. 37, No. 7, pp. 922-925 1998.
Karl Ziegler, et al, "Das muelheimer normaldruck-polyaethylenverfahren", Angewandte Chemie, No. 19/20, pp. 541-547 1955.
Natta, J. Am. Chem. Soc., vol. 84, pp. 1488-1490 Apr. 20, 1962.
Hansjoerg Sinn et al, "Ziegler-Natta Catalysis", Advances in Organometallic Chemistry, vol. 18, pp. 99-149 1980.
Stefan Mecking, "Olefin polymerization by late transition metal complexes—a root of Ziegler catalysts gains new ground", Angew. Chem. Int. Ed. vol. 40, No. 3, pp. 534-540 2001.
Florian M. Bauers et al, "High molecular mass polyethylene aqueous latexes by catalytic polymerization", Angew. Chem. Int. Ed. vol. 40, No. 16, pp. 3020-3022 2001.
Anke Held, et al, "Coordination polymerization of ethylene in water by Pd(II) and Ni (II) catalysts", Chem. Commun., pp. 301-302 2000.
Atanas Tomov et al., "Emulsion polymerization of ethylene in water medium catalysed by organotransition metal complexes", Macromol. Symp., vol. 150, pp. 53-58 2000.
Anke Held, et al., "Aqueous polyketone latices prepared with water-insoluble palladium(II) catalysts", Macromolecules, vol. 35, No. 9, pp. 3342-3347 2002.
Ekkehard Lindner, et al, "Catalytic activity of cationic diphospalladium (II)j complexes in the alkene/CO copolymerization in organic solvents and water in dependence on the length of the alkyl chain at the phosphine ligands", Journal of Organometallic Chemistry, vol. 602, pp. 173-187 2000.

(Continued)

*Primary Examiner*—Fred M Teskin
(74) *Attorney, Agent, or Firm*—Oblon, Spivak, McClelland, Maier & Neustadt, P.C.

(57) ABSTRACT

A process for preparing a polymer powder by evaporating the volatile constituents from an aqueous dispersion of a film-forming polymer P, wherein prior to the evaporation of the volatile constituents the aqueous polymer dispersion still comprises drying assistants T, present in an amount of from 0.1 to 80% by weight, based on the polymer P of the dispersion, and there being used as drying assistant T polyvinylformamide. The polyvinylformamide used preferably has a K value (KW), determined by the method of Fikentscher in accordance with DIN 53726, of from 5 to 50.

20 Claims, No Drawings

OTHER PUBLICATIONS

Goeran Verspui et al, "Ein stabiler, bemerkenswert aktiver, wasserloeslicher pd-katalysator zue altemierenden copolymerisation von ethen und co in wasser", Angew, Chem. vol. 112, No. 4, pp. 825-827 2000.

H. Ono et al., "The stereoregular emulsion polymerization of butadiene", Journal of Polymer Science: Part A: Polymer Chemistry, vol. 38, pp. 1083-1089 2000.

R.E. Rinehart, "Polymerizations catalyzed by noble metal-olefin complexes", J. Polymer Sci. Part C, No. 27, pp. 7-25 1969.

* cited by examiner

PREPARATION OF POLYMER POWDERS

CROSS-REFERENCE TO RELATED APPLICATIONS

This application is a 371 of PCT/EP04/004959, filed May 10, 2004, and claims priority to German Application No. 103227873, filed May 19, 2003.

The present invention relates to a process for preparing a polymer powder by evaporating the volatile constituents from an aqueous dispersion of a film-forming polymer P, wherein prior to the evaporation of the volatile constituents the aqueous polymer dispersion still comprises drying assistants T, present in an amount of from 0.1 to 80% by weight, based on the polymer P of the dispersion, there being used as drying assistant T polyvinylformamide.

The present invention further relates to the polymer powders obtainable by this process, to their use as binders, and to mineral binding construction materials which comprise such polymer powders.

Aqueous dispersions of film-forming polymers find broad application, for example, as cobinders for mineral construction materials or as binders, especially for synthetic resin renders or highly pigmented interior paints, adhesives or coating compositions. In many cases, however, the desire is to use not the aqueous polymer dispersion itself but rather the polymer present therein in powder form.

In order to obtain the film-forming polymer in powder form the dispersion is subjected to a drying operation in which its volatile constituents are evaporated by an appropriate method, by means of spray drying or freeze drying, for example. It must be borne in mind that the evaporation of the aqueous dispersing medium may be accompanied by irreversible aggregation of the polymer particles of the aqueous dispersion with one another, to form secondary particles. The formation of secondary particles results in a poorer redispersibility, which is generally accompanied by poorer performance properties of the powder. It also leads to the formation of deposits on the walls of the dryer and hence to a reduction in the powder yield.

In order to prevent or at least reduce the irreversible formation of secondary particles during powder production, drying assistants are added. These assistants are often also referred to as spraying assistants, since spray drying is particularly conducive to the formation of irreversibly agglomerated secondary particles. This effect becomes more and more pronounced as the glass transition temperature of the polymer particles falls (and hence as their softening temperature or minimum film formation temperature falls), especially when this temperature lies below the drying temperature.

At the same time, drying assistants generally have the effect of reducing the formation of a polymer deposit which remains adhering to the walls of the dryer, and so bring about an increase in the powder yield.

As drying assistants it is common to use, not least owing to their favorable price, the salts, preferably the alkali metal, alkaline earth metal or ammonium salts, of condensation products of aromatic sulfonic acids with formaldehyde (arylsulfonic acid-formaldehyde condensates).

DE-A-24 45 813 describes a pulverulent polymer which can be redispersed in aqueous systems and comprises as drying assistant from 1 to 20% by weight of a water-soluble sulfo- or sulfonato-functional condensation product of aromatic hydrocarbons and formaldehyde, such as phenolsulfonic acid- or naphthalenesulfonic acid-formaldehyde condensates.

WO 98/03577 discloses salts of naphthalenesulfonic acid-formaldehyde condensation products having a number-average molecular weight Mn of less than 1500 daltons, which have particularly good spraying assistant properties.

EP-A-407 889 in a similar manner describes the use of a water-soluble alkali metal salt or alkaline earth metal salt of a phenolsulfonic acid-formaldehyde condensate as a spraying assistant for producing water-redispersible polymer powders.

WO 98/03576 likewise discloses salts of phenolsulfonic acid-formaldehyde condensates which have a number-average molecular weight Mn of less than 1500 daltons and particularly good spraying assistant properties.

The use of drying agents, and particularly of arylsulfonic acid-formaldehyde condensates, has the disadvantage, however, of adversely affecting the formation of a film by the powder particles in the redispersed state, which is necessary for the application.

Furthermore, DE-A 10040826 discloses a process for drying dispersions based on styrene-butadiene copolymers where spray drying takes place in the presence of salts of oligomeric arylsulfonic acid-formaldehyde condensates as drying assistants. The dispersions described therein contain at least 1.5% by weight of an anionic surface-active compound having at least one $C_6$-$C_{32}$ alkyl group. Features of the process described include effective redispersibility and filming of the resultant powders. These are not completely colorless and are therefore not effectively useful for certain fields of application.

Subject matter of EP-A 1036101, moreover, is a process for preparing emulsifier-free, protective-colloid-stabilized copolymers based on vinylaromatics and 1,3-dienes. DE-A 19853450 likewise disclosed emulsifier-free dispersion powders starting from copolymers of styrene and butadiene. The particle size of the resultant, emulsifier-free styrene-butadiene dispersions, containing protective colloid, is very coarse, however, as a consequence of which the dispersions contain high concentrations of the foul-smelling Diels-Alder product 4-phenylcyclohexene.

When films are formed under the usual conditions from acrylamide-free dispersions based on copolymers of styrene and butadiene, spray dried beforehand using customary spraying assistants (drying assistants) such as polyvinyl alcohol, naphthalenesulfonic acid-formaldehyde condensates, phenolsulfonic acid-formaldehyde condensates, polymaleic acid or polyacrylic acid, the resultant films are frequently fissured. Flawless filming of the redispersed dispersion powder is important, however, for application in numerous systems, such as in mortar modification or in paints, for example.

It is an object of the present invention to remedy the disadvantages depicted and to develop a process for preparing polymer powders which is very easy to implement and leads to polymer powders which are without odor or color, exhibit effective redispersibility and filming and, moreover, have as little effect as possible on the cement rheology.

We have found that this object is achieved by a process for preparing polymer powders where first the volatile constituents are evaporated from aqueous dispersions of film-forming polymers P, wherein prior to the evaporation of the volatile constituents the aqueous polymer dispersion still comprises drying assistants T, present in an amount of from 0.1 to 80% by weight, based on the polymer P of the dispersion, there being used as drying assistant T polyvinylformamide.

Film-forming denotes that the polymer particles of the aqueous dispersion, or the powder particles in an aqueous redispersion, coalesce when the water is evaporated (drying) above a temperature specific to them, the minimum film formation temperature MFFT, and form a coherent polymer film. An aqueous redispersion is an aqueous dispersion of the polymer powder.

The polyvinylformamide that is used as drying assistant T is added, according to the process of the invention, in an amount of from 0.1 to 80% by weight, in particular in an amount of from 1 to 50% by weight, preferably in an amount of from 2 to 30% by weight, and in particular in an amount of from 5 to 20% by weight, based on the polymer of the dispersion.

It is advisable here to use a polyvinylformamide which possesses a K value (KW), determined by the method of Fikentscher in accordance with DIN 53726, of from 5 to 50 (H. Fikentscher, Cellulosechemie 13, pages 58 to 64 and 71 to 74 (1932); determined in 0.5% by weight sodium chloride solution). Particular preference is given here to using a polyvinylformamide possessing a K value (KW) of from 10 to 40.

Polyvinylformamides of this kind are obtainable, inter alia, by free-radical polymerization of vinylformamide in aqueous solution. The preparation of polyvinylformamide is known, inter alia, from EP-B 71050, whose disclosure content is expressly intended to form part of the description of this application. The term "polyvinylformamide" is intended to comprehend not only homopolymers of vinylformamide but also, in particular, copolymers of vinylformamide with up to 30 mol % of structural units of the formula

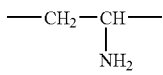

Suitable polymers for the process of the invention and for the polymer powder likewise of the invention are essentially all film-forming polymers which form aqueous dispersions or can be prepared as aqueous dispersions. The polymers in question are normally those synthesized from ethylenically unsaturated monomers, for example from (a) 80 to 100% by weight of at least one monomer selected from vinylaromatic compounds, esters of α,β-monoethylenically unsaturated $C_3$-$C_6$ carboxylic acids and $C_1$-$C_{12}$ alkanols, preferably $C_1$-$C_8$ alkanols, vinyl esters and allyl esters of $C_1$-$C_{12}$ carboxylic acids, and conjugated $C_4$-$C_{10}$ diolefins, and (b) from 0 to 20% by weight of at least one other monomer containing at least one ethylenically unsaturated group.

All amounts specified for monomers are based on 100% by weight, i.e., on the total amount of the monomers to be polymerized.

Examples of vinylaromatic compounds are styrene, α-methylstyrene, $C_1$-$C_4$ alkyl-styrenes such as o-vinyltoluene and tert-butylstyrene.

The esters of α,β-monoethylenically unsaturated carboxylic acids are, in particular, esters of acrylic acid and of methacrylic acid. Examples of such esters are methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, 2-ethylhexyl (meth)acrylate, n-decyl (meth)acrylate, and dodecyl (meth)acrylate.

Vinyl esters and allyl esters that can be used are vinyl acetate, vinyl propionate, vinyl n-butyrate, vinyl laurate, and vinyl stearate, and the corresponding allyl esters.

Suitable conjugated $C_4$-$C_{10}$ diolefins are butadiene and isoprene, for example.

Examples of the monomers (b) are:
ethylenically unsaturated, acid-functional monomers such as monocarboxylic and dicarboxylic acids having 3 to 8 carbon atoms, such as acrylic acid, methacrylic acid, crotonic acid, acrylamidoglycolic acid, vinylacetic acid, maleic acid, itaconic acid, and the monoesters of maleic acid with $C_1$-$C_4$ alkanols, ethylenically unsaturated sulfonic acids such as vinylsulfonic acid, allylsulfonic acid, styrenesulfonic acid, 2-acrylamido-methylpropanesulfonic acid, and ethylenically unsaturated phosphonic acids, e.g., vinylphosphonic acid, allylphosphonic acid, styrenephosphonic acid, and 2-acrylamido-2-methyl-propanephosphonic acid and the water-soluble salts thereof, examples being their alkali metal salts, preferably acrylic acid and methacrylic acid. Such monomers may be present in the polymers P in an amount of up to 10% by weight, e.g., from 0.1 to 10% by weight, preferably from 0.1 to 4% by weight;

amides of ethylenically unsaturated carboxylic acids, such as acrylamide and methacrylamide, and also the N-alkylol amides, preferably the N-methylol amides, of ethylenically unsaturated carboxylic acids, such as N-methylolacrylamide and N-methylol-methacrylamide. Monomers of this kind can be present in the polymers P in an amount of up to 10% by weight, e.g., from 0.1 to 10% by weight, preferably from 0.1 to 4% by weight;

hydroxyalkyl esters of ethylenically unsaturated carboxylic acids, especially hydroxyethyl and hydroxypropyl esters, e.g., hydroxyethyl acrylate, hydroxypropyl acrylate, hydroxyethyl methacrylate, and hydroxypropyl methacrylate. Monomers of this kind can be present in the polymers P in an amount of up to 10% by weight, e.g., from 0.1 to 10% by weight, preferably from 0.5 to 6% by weight;

acrylonitrile and methacrylonitrile. Monomers of this kind can be present in the polymers P in an amount of up to 10% by weight, e.g., from 0.5 to 10% by weight.

Reactive monomers: The reactive monomers include those having a reactive functionality which is suitable for crosslinking. These include, in addition to the aforementioned ethylenically unsaturated carboxylic acids, their N-alkylol amides, and hydroxyalkyl esters, monomers which contain a carbonyl group or an epoxy group, such as N-diacetoneacrylamide, N-diacetonemethacrylamide, acetylacetoxyethyl acrylate and acetylacetoxyethyl methacrylate, and glycidyl acrylate and glycidyl methacrylate. Monomers of this kind may be present in the polymers P in an amount of up to 10% by weight, e.g., from 0.5 to 10% by weight;

and crosslinking monomers. The crosslinking monomers include those containing at least two nonconjugated ethylenically unsaturated bonds, e.g., the di- and tri-acrylates and -methacrylates of alcohols with a functionality of two or three, such as ethylene glycol diacrylate, diethylene glycol diacrylate, triethylene glycol diacrylate, butanediol diacrylate, hexanediol diacrylate, trimethylolpropane triacrylate, and tripropylene glycol diacrylate. Monomers of this kind may be present in the polymers P in an amount of up to 2% by weight, preferably not more than 1% by weight, e.g., from 0.01 to 2% by weight, preferably from 0.01 to 1% by weight. In one preferred embodiment the polymers P contain no copolymerized crosslinking monomer.

The process of the invention is of preferred suitability for preparing polymer powders based on styrene-butadiene copolymers. The term copolymer is in this context not to be interpreted restrictively and embraces those polymers which in addition to styrene and butadiene include further copoly merized ethylenically unsaturated monomers. Styrene-butadiene copolymers are generally synthesized from

- 10 to 90% by weight, preferably from 20 to 80% by weight, in particular from 40 to 75% by weight of styrene and, if desired, one or more other vinylaromatic monomers,
- from 10 to 90% by weight, preferably from 20 to 80% by weight, in particular from 25 to 60% by weight of 1,3-butadiene, alone or in a mixture with another conjugated diolefin such as isoprene, and, if desired,
- up to 20% by weight, preferably up to 10% by weight, e.g., from 0.1 to 20% by weight, preferably from 0.1 to 10% by weight, of one or more of the aforementioned monomers (b).

The weight ratio of vinylaromatic monomers to butadiene is generally in the range from 1:9 to 9:1, in particular from 4:1 to 1:4, and very preferably from 3:1 to 1:1.

In one preferred embodiment of the present invention the polymer P is synthesized from

- 20 to 80%, in particular from 40 to 75%, by weight of styrene,
- from 20 to 80%, in particular from 25 to 60%, by weight of butadiene, and if desired
- from 0.1 to 10%, preferably from 0.1 to 5%, by weight of carboxyl-containing monomers, especially acrylic acid, methacrylic acid and/or itaconic acid.

The process of the invention is particularly suitable for preparing polymer powders wherein the polymer in the dispersion does not exceed a glass transition temperature (DSC, midpoint temperature, ASTM D 3418-82) of 65° C., in particular 50° C., more preferably 30° C. The glass transition temperature of the polymers is generally at least −60° C., preferably at least −40° C. and in particular at least −20° C. The glass transition temperature of a polymer approximately corresponds or is slightly above the minimum film formation temperature.

It is often useful in this context to estimate the glass transition temperature Tg of the dispersed polymer. According to Fox (T. G. Fox, Bull. Am. Phys. Soc. (Ser. II) 1, 123 [1956] and Ullmanns Encyklopädie der technischen Chemie, Weinheim (1980), p. 17, 18) the glass transition temperature of copolymers of high molar masses is given in good approximation by $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions of the monomers 1, 2, ..., n and $T_g^1, T_g^2, \ldots, T_g^n$ are the glass transition temperatures of the homopolymers of the monomers 1, 2, ..., n, in degrees Kelvin. The latter are known, for example, from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed., J. Wiley, New York 1989.

Preferred polymer dispersions, moreover, are those in which the weight-average diameter $d_w$ of the dispersed polymer particles is $\geq 100$ nm. The weight-average diameter $d_w$ is normally $\leq 2000$ nm.

The $d_w$ value for the particle size is defined as usual as the weight average of the particle size as determined by means of an analytical ultracentrifuge by the method of W. Scholtan and H. Lange, Kolloid-Z. und Z.-Polymere 250 (1972) pages 782 to 796. The ultracentrifuge measurement yields the integral mass distribution of the particle diameter of a sample. From this it is possible to infer what percentage by weight of the particles have a diameter equal to or below a particular size.

The preparation of the polymer dispersions to be dried is known and takes place generally, in the case of polymers synthesized from ethylenically unsaturated monomers, by means of a free-radical aqueous emulsion polymerization; in other words, the monomers are polymerized in an aqueous emulsion in the presence of surface-active substances and at least one free-radical initiator.

Free-radical initiators (polymerization initiators) suitably include all compounds capable of setting off a free-radical aqueous emulsion polymerization. These include organic and inorganic peroxides and hydroperoxides and also azo compounds. Likewise suitable are redox initiator systems, which generally comprise a peroxide compound and a reducing agent, such as ascorbic acid, hydroxymethanesulfinic acid, the adduct of bisulfite with acetone, sodium sulfite or sodium hydrogensulfite, and/or a transition metal ion which is able to change its valence, in the form for example of water-soluble salts such as iron salts, vanadium salts or copper salts and water-soluble complexes thereof. Preferred initiator systems are the peroxides and hydroperoxides such as hydrogen peroxide, tert-butyl hydroperoxide, and isopropyl hydroperoxide. Preferred initiators are also the salts of peroxodisulfuric acid, particularly its alkali metal salts (e.g., potassium salt and sodium salt) and/or its ammonium salts. The free-radical initiator is normally used in an amount of from 0.1 to 3% by weight, based on the monomers to be polymerized.

Suitable surface-active substances include not only protective colloids, i.e. water-soluble polymers having a molecular weight $M_n \geq 2000$, but also anionic or neutral surface-active compounds (emulsifiers), which unlike the protective colloids generally have a molecular weight $M_n \leq 2000$ and in particular <1000. The surface-active substances are normally used in amounts of up to 10% by weight, preferably from 0.1 to 5% by weight, based on the monomers to be polymerized, with anionic emulsifiers (compounds AO) generally accounting for not more than 1% by weight, e.g., from 0.1 to 1% by weight, of the monomers to be polymerized.

Suitable protective colloids are polyvinyl alcohols, starch derivatives and cellulose derivatives, polyacrylic acids, copolymers of acrylic acid and of methacrylic acid with hydrophobic monomers and/or with hydroxyl-carrying monomers, polyacrylamide or vinylpyrrolidone polymers.

Suitable anionic emulsifiers include salts of those compounds which have at least one $C_6$-$C_{32}$ alkyl group, in particular one $C_8$-$C_{22}$ alkyl group, and a functionality suitable for salt formation with a base, e.g., a carboxyl, sulfonyl, phosphonyl, phosphate or sulfate group, preferably a sulfate group or sulfonate group. Counterions of preferred salts are alkali metal, alkaline earth metal or ammonium ions and especially sodium, potassium, and calcium ions. Compounds of this kind are known from the prior art; inter alia, from Houben-Weyl, Methoden der organischen Chemie, Volume XIV/1, Macromolecular Compounds, Georg-Thieme-Verlag, Stuttgart, 1961, pp. 192-208.

Examples of suitable anionic emulsifiers are salts of alkyl sulfates derived from linear or branched alcohols, e.g., fatty alcohols or oxo alcohols (alkyl: $C_8$-$C_{32}$), of sulfuric monoesters with ethoxylated alkanols which are derived from linear or branched alcohols, e.g., fatty alcohols or oxo alcohols (EO units: 2 to 50, alkyl: $C_8$ to $C_{32}$), of sulfuric monoesters of ethoxylated alkylphenols with a preferably linear alkyl radical (EO units: 2 to 50, alkyl: $C_6$-$C_{22}$), of alkylsulfonic acids (alkyl: $C_8$-$C_{32}$), of dialkyl esters of sulfosuccinic acid (alkyl: $C_6$ to $C_{32}$), and of alkylarylsulfonic acids with a preferably linear alkyl radical (alkyl: $C_6$ to $C_{32}$). Further suitable anionic emulsifiers include the salts of the di-$C_8$-$C_{32}$-alkyl derivatives of bis(phenylsulfonyl)ether and the technical-grade mixtures thereof, which are on the market, for example, as DOWFAX® 2A1 from DOW Chemical Co.

Also preferred are the compounds of the formula I

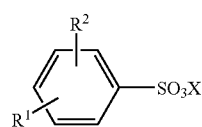

(I)

where $R^1$ is a $C_6$-$C_{32}$ alkyl group, and preferably a $C_8$-$C_{22}$ alkyl group, $R^2$ is hydrogen, $C_1$-$C_4$ alkyl, a fused benzene ring optionally substituted by $C_1$-$C_4$ alkyl, or is a phenoxy radical with or without a $C_6$-$C_{32}$ alkyl group and/or a sulfonate group, and X is one cation equivalent and is preferably an alkali metal cation, in particular a sodium or potassium ion, one equivalent of an alkaline earth metal cation, especially ½ $Ca^{2+}$, or an ammonium ion.

With particular preference $R^2$ in formula I is hydrogen and $R^1$ is attached para to the sulfonate group.

Besides the abovementioned anionic emulsifiers the polymer dispersion used in the process of the invention may also include nonionic surface-active compounds (nonionic emulsifiers). Preferred nonionic emulsifiers are araliphatic emulsifiers, examples being ethoxylated mono-, di-, and trialkylphenols (EO units: 3 to 50, alkyl: $C_6$-$C_{32}$), or aliphatic emulsifiers based on alkyl-substituted aromatics, examples being ethoxylates of long-chain alcohols, e.g., of oxo alcohols or fatty alcohols (EO units: 3 to 50, alkyl: $C_8$-$C_{32}$). These emulsifiers can be present in the polymer dispersion in amounts of up to 10% by weight, preferably up to 4% by weight and in particular up to 2% by weight, e.g., from 0.1 to 10%, preferably from 0.1 to 4%, and in particular from 0.2 to 2%, by weight.

The surface-active substances used can be added to the polymer dispersion that is to be dried either during the drying operation or, preferably, even before. It is advisable to employ the surface-active substances during the preparation of the aqueous polymerization.

The polyvinylformamide that is used in accordance with the invention as drying assistant T can be added both during the actual drying operation and to the aqueous polymer dispersion beforehand. The polyvinylformamide is preferably added to the aqueous dispersion following its preparation but before the drying operation. The addition of the polyvinylformamide to the aqueous polymer dispersion may also be carried out in portions at certain times after the end of the preparation of the aqueous polymer dispersion.

In order to set the desired molecular weight it is possible to use small amounts of regulating substances as well, e.g., from 0.01 to 2% by weight, based on the monomers to be polymerized, in the polymerization. Suitable regulators are, for example, compounds containing a thiol group and/or a silane group (e.g., t-dodecyl mercaptan, n-dodecyl mercaptan or mercaptopropyltrimethoxysilane), allyl alcohols, or aldehydes, such as formaldehyde, acetaldehyde, and the like.

The emulsion polymerization can take place either continuously or by the batch method, preferably by a semicontinuous process. In this case the monomers to be polymerized can be supplied continuously to the polymerization mixture, including by a staged or gradient procedure. For this purpose it is possible to supply the monomers to the polymerization either as a monomer mixture or else as an aqueous monomer emulsion.

In addition to the seed-free preparation mode it is also possible for the emulsion polymerization to take place by the seed latex process or in the presence of seed latex prepared in situ, for the purpose of setting a defined polymer particle size. Processes relating to such a procedure are known and can be found in the prior art (see EP-B 40419 and 'Encyclopedia of Polymer Science and Technology', Vol. 5, John Wiley & Sons Inc., New York 1966, p. 847).

In one preferred embodiment of the present invention the polymerization is conducted in the presence of from 0.01 to 3% by weight and in particular from 0.05 to 1.5% by weight of a seed latex (solids content of the seed latex, based on the total monomer amount), preferably with seed latex included in the initial charge (initial-charge seed). The weight-average particle size of the latex is generally from 10 to 400 nm, preferably from 20 to 120 nm, and in particular from 20 to 50 nm. Its constituent monomers include for example styrene, methyl methacrylate, n-butyl acrylate, and mixtures thereof, it being possible for the seed latex to contain as well, in copolymerized form, minor amounts of ethylenically unsaturated carboxylic acids, e.g., acrylic acid and/or methacrylic acid and/or their amides, preferably at less than 10% by weight, based on the overall weight of the polymer particles in the seed latex.

Polymerization is generally conducted at temperatures between room temperature and 120° C., preferably at temperatures from 40 to 110° C., and with particular preference at between 50 and 100° C. and at a pressure in the range from 1 to 10 bar.

Following the polymerization reaction proper it may be necessary to make the aqueous polymer dispersions of the invention substantially free from odoriferous substances, such as residual monomers and other volatile organic constituents. This can be done, conventionally, by physical means, by distillative removal (in particular by way of steam distillation) or by stripping with an inert gas. The reduction in residual monomer content may also take place chemically, by free-radical postpolymerization, in particular under the action of redox initiator systems, as set out for example in DE-A 44 35 423, DE-A 44 19 518, and DE-A 44 35 422. The postpolymerization is preferably carried out with a redox initiator system composed of at least one organic peroxide and one organic sulfite.

In this way it is possible to obtain polymer dispersions having polymer contents of up to 80% by weight, based on the overall weight of the dispersion. The solids content of the polymer dispersions prepared in this way will generally be situated within the range from 40 to 60% by weight. The polymer dispersions thus obtainable can then be adjusted where necessary to the solids content desired for drying, by dilution with a suitable solvent, such as with water or a water/emulsifier mixture, for example, and/or through the addition of an aqueous solution of the drying assistant.

The solids content of the polymer dispersion which is to be dried and which already contains the drying assistant is generally in the range from 10 to 60%, preferably from 20 to 55% by weight (calculated in each case as polymer+drying assistant, based on the total weight of the dispersion).

The evaporation of the volatile constituents from the aqueous polymer dispersion (also referred to below as drying) takes place in conventional fashion, by freeze drying or, preferably, by spray drying, for example.

In the case of spray drying the polymer dispersions to be dried are dried in the presence of the drying assistant in a drying tower, through which a stream of hot air is passed. The temperature of the hot air stream is generally from 100 to 200° C., preferably from 110 to 170° C., at the drying tower entrance and from about 30 to 100° C., preferably from 50 to 80° C., at the tower exit. The polymer dispersion to be dried can be introduced counter to the stream of hot air or, preferably, parallel with the stream of hot air. The addition may be made by way of single-fluid or multi-fluid nozzles or by way of a rotating disk. The polymer powders are separated out in conventional fashion, using cyclones or filter separators, for example.

In principle the polyvinylformaide that is used as drying agent T can be added during the drying operation in the form of solutions, as aqueous or aqueous-alcoholic solutions, for example, to the polymer dispersion that is to be dried. It is preferred to add the drying assistant to the polymer dispersion prior to drying. The drying agent can be added either as a solid or, preferably, as a solution, e.g. as an aqueous-alcoholic solution or, in particular, as an aqueous solution, to the dispersion.

A further possibility is to add an anticaking agent during the drying operation to the polymer dispersion that is to be dried. This anticaking agent is a finely divided inorganic oxide, a finely divided silica or a finely divided silicate, e.g. talc, for example. The finely divided inorganic oxide preferably has an average particle size in the range from 0.01 to 0.5 µm. Particular preference is given to finely divided silica having an average particle size in the range from 0.01 to 0.5 µm, which either may be hydrophilic or may have been hydrophobicized. Mixtures of hydrophilic and hydrophobicized anticaking agents are employed with very particular preference. The anticaking agent can be metered in before or during the drying of the polymer dispersion. In another embodiment the anticaking agent is added to the polymer powder in a mixer suitable for solids, such as a shaker, roller-bed screw mixer or the like.

Where desired the anticaking agent is used in an amount of from 0.5 to 15% by weight and, preferably, in an amount of from 2 to 12% by weight, based on the polymer powder (or on the sum of polymer P+drying assistants in the aqueous polymer dispersion).

The polymer powders obtained by the process of the invention are likewise provided by the present invention. Aqueous redispersions of the polymer powders, in the presence of water, have features including an improved film-forming capacity. Surprisingly the process of the invention also leads to better results in spray drying, such as to an increased powder yield and to reduced formation of deposits, for example. Other performance properties are, surprisingly, not adversely affected.

The polymer powders obtained by the process of the invention comprise
i at least one film-forming polymer P,
ii from 0.1 to 80% by weight, based on the polymer P, of polyvinylformamide as drying assistant T,
iii if desired, surface-active compounds in an amount of up to 10% by weight, based on the polymer P, and
iv if desired, fillers, pigments, anticaking agents and/or customary auxiliaries, e.g., prior art drying assistants, biocides and/or defoamers.

The polymer powders of the invention are suitable as cobinders in mineral binding construction materials and ready-to-use binding construction material formulations, as binders in paints, varnishes, adhesives, coating materials, and sealants, in construction adhesives, e.g., flooring adhesives and especially tile adhesives, and in synthetic resin renders.

The polymer powders obtainable in accordance with the invention are especially suitable as cobinders in mineral binding construction materials and in ready-to-use formulations of these construction materials, and also in construction adhesives. These are likewise provided by the present invention.

By mineral binding construction materials and formulations thereof are meant compositions which comprise at least one mineral binder such as lime, gypsum, clay and/or cement and, if desired, mineral aggregates. The ready-to-use formulation is converted into the actual construction material formulation by stirring with water, and this construction material formulation, if left to itself, forms a stonelike solid in air or even under water, where appropriate with exposure to elevated temperature. Besides the mineral aggregates, mineral construction material formulations also include customary auxiliaries, such as thickeners or plasticizers and defoamers, in accordance with the intended application.

Preferred mineral binders contain from 70 to 100% by weight of cement and from 0 to 30% by weight of gypsum. In particular, cement is the sole mineral binder. The effect according to the invention is substantially independent of the type of cement. Depending on the project, therefore, it is possible to use blast furnace cement, oil shale cement, Portland cement, hydrophobicized Portland cement, quick-setting cement, swelling cement or alumina cement, the use of Portland cement being found particularly favorable.

The dry compositions of mineral binding construction materials typically contain, based on the amount of mineral binder, from 0.1 to 20% by weight, in particular from 0.5 to 10%, by weight of modifying addition-polymer powder. The weight fraction of polymer to mineral binder is generally in the range from 1:100 to 1:1.

In order to improve their processing properties the mineral binding construction materials are frequently admixed with cellulose derivatives and microsilica. The former normally have a thickening effect and the latter normally constitute thixotropic agents which additionally lower the fluidity of the aqueous mortar prior to its solidification in the applied state of rest. By adding defoamers (preferably in powder form in the context of what are known as dry mortars) it is possible in the solidified state to achieve, in the solidified cementitious mortar, an air pore content which is in tune with practice (from 5 to 20% by volume).

Sand, such as quartz sand, and also, where appropriate, fillers such as calcium carbonate and pigments such as titanium dioxide or iron oxide, and natural and synthetic fibers generally constitute the other aggregates.

Construction adhesives include, for example, flooring adhesives and tile adhesives. As adhesive component they comprise at least one polymer powder of the invention and also, depending on the nature of the formulation, plasticizers, fillers, dispersing assistants, biocides, and also, where appropriate, water, defoamers, thickeners, thixotropic agents, and other additives. In one preferred embodiment they further comprise a mineral binder, e.g., cement. Formulations of this kind are used in particular as tile adhesives. Because of the mineral binder they are likewise included among the mineral binding construction materials.

Typical mineral binding construction materials and other construction adhesives such as tile adhesives, in particular in the form of a dry mineral binding construction material for mulation, contain (based on the total weight of the solids present in them)

from 10 to 60%, preferably from 15 to 50%, by weight of mineral binder (preferably exclusively cement, especially Portland cement)

from 0.1 to 20%, frequently from 0.2 to 15% by weight, in particular from 0.5 to 10% by weight, and especially from 2 to 8% by weight of polymer powder of the invention, up to 25% by weight of conventional auxiliaries, such as defoamers, thickeners, plasticizers, and thixotropic agents, and, as the remainder, from 30 to 80% by weight of aggregates, such as sand, fillers (e.g., $CaCO_3$), pigments (e.g. $TiO_2$), and natural and/or synthetic fibers. Defoamers are used generally in an amount of from 0.1 to 2% by weight, thixotropic agents at up to 2% by weight, and plasticizers at up to 1% by weight.

Typical embodiments of mineral binding construction material formulations are cementitious repair mortars or reinforcing mortars. Customary reinforcing mortars normally have their crack-bridging capacity raised by the addition of natural or synthetic fibers of materials such as Dralon (length, for example, from 1 to 10 mm, linear density, for example, from 3 to 10 dtex) in an amount of up to 10% by weight. An overview of auxiliaries and aggregates is given by H. Reul in Handbuch der Bauchemie, Verlag für chemische Industrie, H. Zielkowsky KG, Augsburg, 1991.

A further preferred embodiment of mineral binding construction material formulations are tile adhesives. In a dry formulation, typical tile adhesives comprise the polymer powder, which accounts for from 0.5 to 10% by weight generally, and from 2 to 8% by weight in particular, of the dry formulation (100% by weight), plus from 15 to 50% by weight of mineral binder, especially cement, from 30 to 80% by weight of aggregates customary for the purpose, especially quartz sand, in a sieve grade of 0.063-0.4 mm, for example, and/or calcium carbonate, and also customary auxiliaries such as thickeners, defoamers, biocides, dispersants, plasticizers, film-forming auxiliaries, etc., in an amount of from 0.1 to 25% by weight.

The process of the invention for preparing polymer powders is easy to implement without great effort or expense and leads to polymer powders which, among other qualities, are colorless and odorless, display effective redispersibility and film formation, and, moreover, have virtually no effect on the cement rheology. The polymer powders, likewise of the invention, are, unlike natural products, readily available and produce a colorless film.

EXAMPLES

I Materials Employed

Polymer dispersion $D_1$: Aqueous styrene-butadiene dispersion containing 50% by weight polymer having a glass transition temperature $T_g$ of about 4° C., containing in copolymerized form 53% by weight styrene, 42% by weight butadiene and 4.5% by weight acrylic acid and 0.5% by weight itaconic acid and is additionally stabilized with 0.5% by weight, based on the polymer, of a sulfated fatty alcohol ethoxylate having a degree of ethoxylation of from 2 to 3 as emulsifier. The polymer dispersion had a particle size of 130 nm and corresponded to the dispersion D1 described at the bottom of page 7 in DE-A 10040826.

In the inventive examples 1 and 2 and in the comparative examples A to C this aqueous polymer dispersion was admixed with the water-soluble polymers indicated below, as drying assistants T.

Polymer dispersion $D_2$: aqueous styrene-acrylate dispersion corresponding to the dispersion $D_1$ described in paragraph 1.1 on page 6, starting line 28, of EP-B 914366. This aqueous dispersion was used in the inventive examples 3 and 4, II Preparation of the Polymer Powder The polymer dispersions $D_1$ and $D_2$ of individual examples 1 to 4 and of comparative examples A to C were sprayed dried in a pilot-plant dryer. The drying assistant T was added in each case in an amount of 10% by weight, or 12.5% by weight, based on the polymer P of the aqueous dispersion, using a silica-gel-based commercial antiblocking agent as free-flow aid.

The solids content of the spray feed was 30% by weight. Atomization took place through a two-fluid Teflon nozzle (gap width 1.3 mm) with an entry temperature of 130° C. and an exit temperature of 60° C.

The drying assistants used were as follows:

$T_1$: Polyvinylformamide K-W: 19.4

$T_2$: Polyvinylformamide K-W: 30.5

$T_3$: Naphthalenesulfonic acid-formaldehyde condensation product in the form of a calcium salt, prepared according to example 2.1 (spraying assistant S1) of EP-B 914366

$T_4$: Copolymer of 50 parts acrylic acid and 50 parts maleic acid with a molar weight by GPC of about 3000 g/mol $T_5$: Drying assistant $T_3$ admixed with 25% arylsulfonate, as anionic emulsifier according to DE-A 1004826, top of page 8

III Results

The results of inventive examples 1 to 4 and of comparative examples A to C are reproduced in table 1 below. Following the respective example or comparative example, this table indicates the amount and type of the specific drying assistant T used. The table also lists the values for the yield and redispersibility, and shows the qualitative scores for powder, film formation, and color.

TABLE 1

| Examples and drying assistants T | Yield | Redispersibility | Powder | Filming | Film |
|---|---|---|---|---|---|
| Example 1: dispersion $D_1$; 10% by weight $T_1$ | 78% | good | 2 | 1 | colorless |
| Example 2: dispersion $D_2$; 10% by weight $T_2$ | 79% | good | 1-2 | 1 | colorless |
| Example 3: dispersion $D_2$; 10% by weight $T_1$ | 81% | good | 1-2 | 1-2 | colorless |
| Example 4: dispersion $D_2$; 10% by weight $T_2$ | 76% | good | 1 | 1 | colorless |
| Comparative example A dispersion $D_1$ 10% by weight $T_3$ | 86% | moderate | 1-2 | 5 | beige |

TABLE 1-continued

| Examples and drying assistants T | Yield | Redispersibility | Powder | Filming | Film |
|---|---|---|---|---|---|
| Comparative example B dispersion $D_1$ 10% by weight $T_4$ | 72% | moderate | 2 | 5 | colorless |
| Comparative example C dispersion $D_1$ 12.50% by weight $T_5$ | 63% | good | 1 | 1-2 | beige |

Scoring - Powder
1 = no caking
2 = minimal caking, easy to pulverize
3 = slight caking, moderately easy to pulverize
4 = severe caking, easy to pulverize
5 = severe caking, difficult to pulverize
6 = severe caking, impossible to pulverize
Scoring - Film formation
1 = films without flaws
2 = films with scars
3 = marginal contraction cracks
4 = extensive contraction cracks
5 = totally fissured
6 = no filming Table 1 shows the results of spray drying. The powders prepared with the spraying assistant of the invention were spray-dryable in a high yield without problems, are readily redispersible, exhibit flawless filming and are not colored (colorless).

Redispersibility: 30 g of the polymer powder prepared according to II were dispersed in 70 ml of deionized water in a vertical cylinder, left for 4 hours at room temperature, and then assessed visually as to the extent to which the polymer phase had settled from the water phase.

Filming: A polymer film was cast from the redispersed dispersion powders, and then dried at room temperature for 4 days. The quality of the film was assessed visually as indicated in table 1.

Determination of the K values (K-W): by the method of Fikentscher, in accordance with DIN 53726, in 0.5% strength aqueous sodium chloride solution.

We claim:

1. A process for preparing a polymer powder comprising evaporating volatile constituents from an aqueous dispersion of a film-forming polymer P, wherein, prior to the evaporation of the volatile constituents, the aqueous polymer dispersion comprises a drying assistant T, present in an amount of from 0.1 to 80% by weight, based on the polymer P of the dispersion, wherein the drying assistant T is polyvinylformamide.

2. The process as claimed in claim 1, wherein the polyvinylformamide used as drying assistant T is present in an amount of from 1 to 50% by weight, based on the polymer P of the dispersion.

3. The process as claimed in claim 1, wherein the polyvinylformamide used as drying assistant T has a K value (KW), determined by the method of Fikentscher in accordance with DIN 53726, of from 5 to 50.

4. The process as claimed in claim 3, wherein the polyvinylformamide used as drying assistant T has a K value (KW) of from 10 to 40.

5. The process as claimed in claim 1, wherein the polymer in the dispersion is a styrene-butadiene copolymer.

6. The process as claimed in claim 1, wherein the polymer in the dispersion has a glass transition temperature $T_g$ of less than 65° C.

7. The process as claimed in claim 1, wherein the polymer dispersion further comprises at least one emulsifier in an amount of up to 10% by weight, based on the polymer.

8. The process as claimed in claim 1, wherein said evaporating follows spray drying said polymer dispersion.

9. An addition polymer powder obtained by a process as claimed in claim 1.

10. The addition polymer powder as claimed in claim 9, comprising
   i at least one film-forming polymer P, and
   ii from 0.1 to 80% by weight, based on the polymer P, of polyvinylformamide as drying assistant T.

11. A cobinder in mineral binding construction materials and ready-to-use binding construction material formulations comprising the polymer powder as claimed in claim 9, wherein the cobinder is utilized, as a binder in paints, varnishes, adhesives, coating materials, sealants, construction adhesives or synthetic resin renders.

12. A mineral binding construction material comprising the polymer powder as claimed in claim 9.

13. A mineral binding construction material in the form of a dry mortar formulation, consisting of
   from 10 to 60% by weight of mineral binder;
   from 0.1 to 30% by weight of polymer powder obtained by evaporating volatile constituents from an aqueous dispersion of a film-forming polymer P, wherein, prior to the evaporation of the volatile constituents, said aqueous polymer dispersion comprises a drying assistant T, present in an amount ranging from 0.1 to 80% by weight, based on the polymer P of the dispersion, said drying assistant T is polyvinylformamide, or an addition polymer powder comprising i) at least one film-forming polymer P, and ii) from 0.1 to 80% by weight, based on the polymer P, of polyvinylformamide as drying assistant T;
   no greater than 25% by weight of an auxiliary customary for mineral binding construction materials; and
   in remainder, an aggregate selected from the group consisting of sand, a filler, a pigment, a natural fiber, a synthetic fiber, and a combination thereof.

14. The mineral binding construction material as claimed in claim 12 in the form of a dry construction adhesive formulation, consisting of
   from 15 to 50% by weight said mineral binder;
   from 0.5 to 10% by weight polymer powder;
   from 0.1 to 25% by weight said auxiliary; and
   from 30 to 80% by weight said aggregate.

15. The addition polymer powder as claimed in claim 10, further comprising: a surface-active compound in an amount no greater than 10% by weight, based on said polymer P.

16. The addition polymer powder as claimed in claim 10, further comprising:

a filler, a pigment, an anticaking agents, a customary auxiliary, or a combination thereof.

17. The addition polymer powder as claimed in claim 10, further comprising:

iii a surface-active compound in an amount no greater than 10% by weight, based on the polymer P, and iv a filler, a pigment, an anticaking agent, a customary auxiliary, or a combination thereof.

18. The mineral binding construction material as claimed in claim 13, wherein said polymer powder further comprises:

a surface-active compound in an amount no greater than 10% by weight, based on said polymer P.

19. The mineral binding construction material as claimed in claim 13, wherein said polymer powder further comprises:

a filler, a pigment, an anticaking agents, a customary auxiliary, or a combination thereof.

20. The mineral binding construction material as claimed in claim 13, wherein said polymer powder further comprises:

iii a surface-active compound in an amount no greater than 10% by weight, based on the polymer P, and iv a filler, a pigment, an anticaking agent, a customary auxiliary, or a combination thereof.

* * * * *